US011202239B2

(12) United States Patent
Bonnet

(10) Patent No.: US 11,202,239 B2
(45) Date of Patent: Dec. 14, 2021

(54) DATA CONNECTION SWITCHING

(71) Applicant: HEWLETT-PACKARD DEVELOPMENT COMPANY, L.P., Houston, TX (US)

(72) Inventor: Alois Bonnet, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 635 days.

(21) Appl. No.: 16/075,767

(22) PCT Filed: Apr. 20, 2017

(86) PCT No.: PCT/US2017/028613
§ 371 (c)(1),
(2) Date: Aug. 6, 2018

(87) PCT Pub. No.: WO2018/194617
PCT Pub. Date: Oct. 25, 2018

(65) Prior Publication Data
US 2021/0211961 A1 Jul. 8, 2021

(51) Int. Cl.
*H04W 36/26* (2009.01)
*H04W 36/16* (2009.01)
(Continued)

(52) U.S. Cl.
CPC ......... *H04W 36/165* (2013.01); *H04W 24/02* (2013.01); *H04W 24/10* (2013.01);
(Continued)

(58) Field of Classification Search
CPC ..... H04W 36/16; H04W 24/02; H04W 28/06; H04W 52/42
See application file for complete search history.

(56) References Cited

U.S. PATENT DOCUMENTS 9,426,642 B1  8/2016 Sridhar et al.
9,531,844 B2  12/2016 Zhou et al.
(Continued)

FOREIGN PATENT DOCUMENTS

CA   2937021 A1   2/2009
CN   1694565      11/2005
(Continued)

OTHER PUBLICATIONS

"Tether Automatically with Wi-Fi Hotspot", Instant Tethering, Pixel Phone Help, Retrieved from Internet: https://support.google.com/pixelphone/answer/7308447?hl=en, 2017, 2 Pages.

*Primary Examiner* — Michael T Vu
(74) *Attorney, Agent, or Firm* — Brooks, Cameron & Huebsch PLLC

(57) ABSTRACT

Example implementations relate to data connection switching. In some examples, a mobile computing device may include a memory resource comprising executable instructions to determine when a metric of a data connection of the first mobile computing device through an access point has exceeded a threshold. The mobile computing device may include a memory resource comprising executable instructions to instruct, responsive to the determination, a second mobile computing device to initiate an operation as a mobile hotspot. The mobile computing device may include a memory resource comprising executable instructions to switch from the data connection through the access point to a data connection through the mobile hotspot of the second mobile computing device.

14 Claims, 3 Drawing Sheets

(51) Int. Cl.
*H04W 36/00* (2009.01)
*H04W 24/02* (2009.01)
*H04W 24/10* (2009.01)
*H04W 36/30* (2009.01)

(52) U.S. Cl.
CPC .......... *H04W 36/03* (2018.08); *H04W 36/26* (2013.01); *H04W 36/30* (2013.01)

(56) References Cited

U.S. PATENT DOCUMENTS

| | | | |
|---|---|---|---|
| 10,015,142 B2 * | 7/2018 | Chechani | H04W 76/11 |
| 2011/0044284 A1 | 2/2011 | Voltolina et al. | |
| 2013/0083783 A1 | 4/2013 | Gupta et al. | |
| 2013/0194989 A1 | 8/2013 | Centonza et al. | |
| 2013/0237148 A1 | 9/2013 | McCann et al. | |
| 2013/0272269 A1 | 10/2013 | Srivastava et al. | |
| 2013/0331028 A1 | 12/2013 | Kuehnel et al. | |
| 2014/0127992 A1 | 5/2014 | Kuscher et al. | |
| 2014/0195654 A1 | 7/2014 | Kiukkonen et al. | |
| 2015/0017985 A1 | 1/2015 | Safavi | |
| 2015/0031367 A1 | 1/2015 | Singh et al. | |
| 2015/0201444 A1 * | 7/2015 | Kiukkonen | H04W 88/04 455/450 |
| 2015/0244721 A1 | 8/2015 | Spencer et al. | |
| 2015/0264554 A1 | 9/2015 | Addepalli et al. | |
| 2016/0094515 A1 | 3/2016 | Chechani et al. | |
| 2016/0286588 A1 | 9/2016 | Gulliksson et al. | |
| 2016/0295622 A1 | 10/2016 | Huang et al. | |
| 2016/0353495 A1 * | 12/2016 | Smadi | H04W 48/20 |

FOREIGN PATENT DOCUMENTS

| | | |
|---|---|---|
| CN | 103200618 A | 7/2013 |
| CN | 105874848 | 8/2016 |
| EP | 3038387 | 6/2016 |
| JP | 2015525010 A | 8/2015 |
| WO | 2015019234 | 2/2015 |
| WO | WO-2016161366 | 10/2016 |

* cited by examiner

DATA CONNECTION SWITCHING

BACKGROUND

Mobile computing devices are prevalent in the human environment. Mobile computing devices may utilize data connections to perform various operations. Data connection metrics may vary as a mobile computing device is moved relative to a source of the data connection.

DETAILED DESCRIPTION

Figure 1:
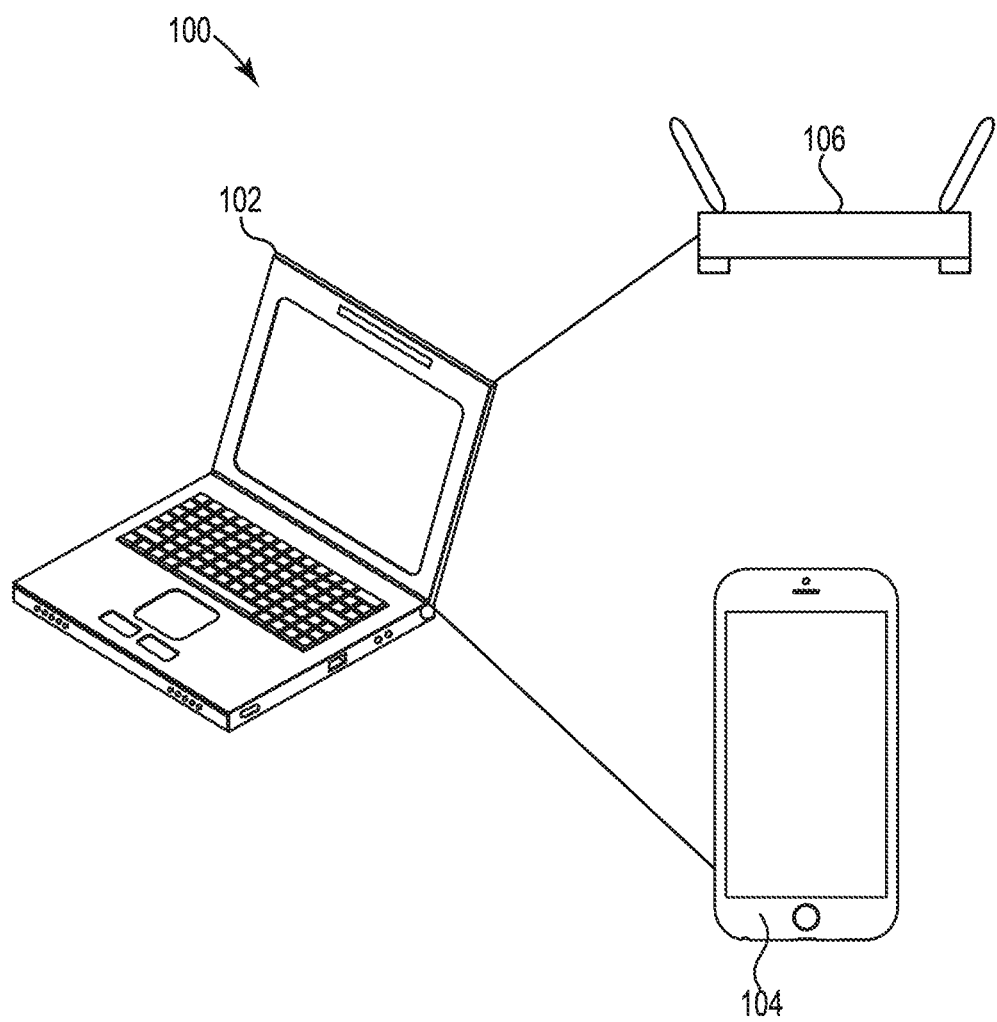
FIG. 1 illustrates an example of a system to perform data connection switching consistent with the disclosure.

A computing device may include a processing resource such as electronic circuitry to execute instructions stored on machine-readable medium to perform various operations. Computing devices may be static or mobile. A static computing device may include a computing device designed for regular use in a single location. For example, a static computing device may include a desktop computer or other computing device that is utilized in a single location. A mobile computing device may include a portable computing device that is designed to be used in a variety of locations and to be transported between locations with relatively little effort. A mobile computing device may combine inputs, outputs, components, and capabilities that are otherwise separate in a static computing device. A mobile computing device may include a laptop computer, smartphone, other smart device, a tablet computer, a personal digital assistant, a convertible laptop, etc.

A mobile computing device may utilize data from a remote location to perform various operations. A mobile computing device may communicate data to a remote location to perform various operations. For example, a mobile computing device may transmit and/or receive data to/from a remote server to send an email, access a web resource on the World Wide Web (WWW), and/or interface with another portion of the Internet.

A mobile computing device may utilize a data connection to transmit and/or receive the data. For example, a mobile computing device may transmit and/or receive data utilizing a data connection with an Internet Service Provider (ISP) established across a broadband data connection network utilizing wide bandwidth data transmission through coaxial cable, optical fiber, twisted pair, etc. A mobile computing device may transmit and/or receive data utilizing a data connection to an ISP established by dialing up the ISP across a conventional telephone line of the public switched telephone network (PSTN) (e.g., a dial-up data connection network). The mobile computing device may transmit and/or receive data utilizing a data connection with an ISP across a cellular data connection network utilizing a wireless wide area network (WWAN), a Global System for Mobile Communications (GSM), Code Division Multiple Access (CDMA), 3G, 4G, Long Term Evolution (LTE), etc.

A metric may be associated with a data connection of a mobile computing device. A metric may be a measure of the overall performance of a data connection as experienced by a user of the mobile computing device using the mobile computing device. In other words, a metric may include a quality of service (QoS) metric of the data connection. As an example, a QoS metric may include a quantitative measure of an error rate, a bit rate, a throughput, a transmission delay, amount of dropped packets, latency, an availability, a jitter, out-of-order delivery, etc. of data transmitted from or to a mobile computing device across the data connection.

A metric associated with a data connection may fluctuate. Fluctuations of the metric may be caused by data connection network conditions, data connection source conditions and/or the position of the mobile computing device relative to a source of the data connection. A source of the data connection may include a networking hardware device that may facilitate access to a data connection for the mobile computing device. For example, a source of the data connection may include a router connected to a network, a wireless access point wired to a network, a mobile hotspot connected to a cellular data network, a WWAN card connected to a cellular data network, etc.

An experience of a user of the mobile computing device and/or an operation by the mobile computing device may be impacted by the fluctuations in a metric associated with a data connection since the ability of the mobile computing device to transmit and/or receive data may be impacted by the fluctuations. For example, metric fluctuations may create a reduction in the transmission and/or receipt of data across the data connection up to and including leading to a loss of the data connection.

When a particular connection source and/or a particular data connection network are producing such a reduction, a user may switch to a different data connection source or data connection network. However, in one example, switching a laptop computer between a broadband data connection network and a WWAN connection network may include purchasing, installing, and configuring additional hardware such as a WWAN card to be utilized by the laptop computer to connect to the WWAN data connection network. Additionally, switching the laptop from a broadband data connection network may include a time-intensive toggling multiple settings of the laptop buried in a menu structure of a graphical user interface (GUI) of the laptop. In another example, switching a laptop from a broadband data connection network may include connecting to a wireless network provided by a separate computing device such as a smartphone connected to a WWAN network and operating as a hotspot. Switch the laptop form a broadband data connection to a hotspot provided network may include a time-intensive toggling multiple settings of the laptop buried in a menu structure of the GUI of the laptop and, similarly, the GUI of the smartphone.

In contrast, examples of the present disclosure may include computing devices, methods, and machine-readable media to perform data connection switching through determining when a metric of a data connection of the first mobile computing device through an access point has exceeded a threshold; instructing, responsive to the determination, a second mobile computing device to initiate operation as a mobile hotspot; and switching from the data connection through the access point to a data connection through the mobile hotspot of the second mobile computing device. The examples of the present disclosure may offer metric-based data connection switching that seamlessly provides a computing device with a data connection to support its operations without involving manual user configuration of the device or other devices. The examples of the present disclosure may include a first mobile computing device instructing a second mobile computing device as to its operation relative to the provision of a data connection in order to achieve the metric-based data connection switching.

FIG. 1 illustrates an example of a system 100 to perform data connection switching consistent with the disclosure. The system 100 may include a first mobile computing device 102. A first mobile computing device 102 may include a laptop computer, smartphone, other smart device, a tablet computer, a personal digital assistant, a convertible laptop, etc. The first mobile computing device 102 may include a personal computer operating system or a hybrid personal/mobile operating system. The first mobile computing device 102 may include hardware and/or computer-readable instructions executable by a processing resource to facilitate a connection to computer networks and other devices (e.g., second mobile computing device 104). For example, the first mobile computing device 102 may include wireless adapter chipsets that facilitate connection and communication between the first mobile computing device 102 and a computer network and/or other computing device.

In an example, the first mobile computing device 102 may include a wireless network adapter chipset that facilitates a Wi-Fi connection. The first mobile computing device 102 may connect to a Wi-Fi wireless network. For example, the first mobile computing device 102 may connect to a Wi-Fi local area network (LAN). The first mobile computing device 102 may connect to the Internet via a Wi-Fi wireless network. For example, the first mobile computing device 102 may connect to an internet-connected Wi-Fi wireless network through an access point (e.g., access point 106). The first mobile computing device 102 may connect to other devices that are sharing and/or providing a Wi-Fi wireless network.

The first mobile computing device 102 may also include hardware to facilitate a direct connection between the first mobile computing device 102 and other devices (e.g., second mobile device 104). For example, the first mobile computing device 102 may include various adapters, chipsets, radios, and/or other hardware to facilitate a Wi-Fi direct, near-field communication (NFC), Bluetooth (e.g., UHF radio waves in the 2.4 to 2.485 GHz), and/or radio-frequency identification (RFID) connection between the first mobile computing device 102 and another device.

In some examples, the first mobile computing device 102 may not include hardware such as a WWAN card that facilitates a direct connection between the first mobile computing device 102 and a cellular data network such as a WWAN network.

The system 100 may include a second mobile computing device 104. The second mobile computing device 104 may include a laptop computer, smartphone, other smart device, a tablet computer, a personal digital assistant, a convertible laptop, a dedicated mobile hotspot, etc. The second mobile computing device 104 may include hardware and/or computer-readable instructions executable by a processing resource to facilitate a connection to a WWAN such as a cellular data network. As used herein, a cellular data network may include a WWAN that utilizes a mobile telecommunications cellular network to transfer data. For example, a cellular data network may utilize technologies such as 3G, 4G, LTE, WIMAX, UMTS, code division multiple access (CDMA), GSM, cellular digital packet data (CDPD), Mobitex, etc. to transfer data between a mobile computing device (e.g., second mobile computing device 104) and an ISP. The second mobile computing device 104 may connect to a cellular data network by an access point such as a cellular tower. The cellular data network may provide the second mobile computing device 104 with access to the Internet.

The second mobile computing device 104 may include other hardware and/or computer-readable instructions executable by a processing resource to facilitate a connection to computer networks and other devices (e.g., first mobile computing device 102). For example, the second mobile computing device 104 may include a wireless network adapter chipset that facilitates a connection to a Wi-Fi wireless network. The second mobile computing device 104 may also include hardware to facilitate a direct connection between the second mobile computing device 104 and other devices (e.g., first mobile computing device 102). For example, the second mobile computing device 104 may include various adapters, chipsets, radios, and/or other hardware to facilitate a Wi-Fi direct, near-field communication (NFC), Bluetooth (e.g., UHF radio waves in the 2.4 to 2.485 GHz), and/or radio-frequency identification (RHO) connection between the second mobile computing device 104 and another device.

The second mobile computing device 104 may include a mobile operating system. A mobile operating system may include an operating system including features for mobile or handheld use such as a touchscreen, cellular communications, Wi-Fi protected access, Wi-Fi connectivity, Global Positioning System (GPS), mobile navigation, camera, video camera, speech recognition, voice recorder, music player, NFC, infrared blaster, etc.

The second mobile computing device 104 may include hardware and/or computer-readable instructions executable by a processing resource to operate as a mobile hotspot. Operating as a hotspot may include tethering or phone as modem (PAM) operation by the second mobile computing device 104. For example, the first mobile computing device 102 may connect to the second mobile computing device 104. The connection may be established over a wireless LAN Wi-Fi connection, Bluetooth connection, and/or a physical cabled connection. In some examples, operating as a mobile hotspot may include changing the operation of the second mobile computing device 104 such that is operates as a wireless access point and/or portable router for the devices connected to it. In examples where the second mobile computing device 104 is connected to the internet, the second mobile computing device 104 may act as an access point to provide network access to the first mobile computing device 102. Since the second mobile computing device 104 may be connected to a cellular data network, the second mobile computing device 104 may act as an access point to provide access to and data communication across the cellular data network for the first mobile computing device 102. Since the second mobile computing device 104 may be connected to the Internet, the second mobile computing device 104 may act as an access point to provide Internet access to the first mobile computing device 102. Operating as a mobile hotspot may include operating in a non-default mode that includes additional configurations outside of a standard operating mode.

The system 100 may include an access point 106. An access point 106 may be a networking hardware computing device that may allow Wi-Fi compliant devices (e.g., first mobile computing device 102) to connect to a wired network. The access point 106 may have no physical connection to the devices that it is connected to. For example, the access point 106 may be a wireless access point that utilizes radio waves such as 2.4 gigahertz and 5 gigahertz super high frequency (SHF) industrial, scientific and medical (ISM) radio bands to communicate with connected devices.

The access point 106 may include a wired Ethernet connection to a router, a modem, an ISP, and/or a wired network. For example, the access point 106 may include a wired connection to the Internet. The access point 106 may provide allow connected device to utilize the wired connection through the wireless connection between the access point 106 and the connected device using radio frequency links to exchange data.

The access point 106 may not be connected to a cellular data network. The access point 106 may be connected and/or a portion of a wireless local area network (WLAN). The access point 106 may be connected with an Internet Service Provider (ISP) across a broadband data connection network utilizing wide bandwidth data transmission through coaxial cable, optical fiber, twisted pair, etc. In another example, the access point 106 may transmit and/or receive data utilizing a data connection to an ISP established by dialing up the ISP across a conventional telephone line of the public switched telephone network (PSTN) (e.g., a dial-up data connection network).

As described above, the system 100 may include the first mobile computing device 102. The first mobile computing device 102 may include a processing resource. Additionally, the first mobile computing device 102 may include a memory resource. The memory resource may include a computer-readable medium. The memory resource may include instructions. The instructions may be executable by the processing resource to perform various operations. For example, the memory resource may include instructions executable instructions to determine when a metric of a data connection of the first mobile computing device 102 has exceeded a threshold.

The data connection may include the delivery from and/or to the first mobile computing device 102 through the access point 106. For example, the data connection may include the communication of data between the first mobile computing device and other devices on the Internet.

A metric of a data connection may include a quality of service (QoS) metric of the data connection. A QoS metric may include a metric of the flow of data between a first mobile computing device 102 and a data network. As an example, a QoS metric may include a quantitative measure of an error rate, a bit rate, a throughput, a transmission delay, amount of dropped packets, latency, an availability, a jitter, out-of-order delivery, etc. of data transmitted from or to the first mobile computing device 102 across the data connection. For example, the metric of the data connection of the first mobile computing device 102 may include a QoS metric associated with Internet access.

The metric may be monitored by the first mobile computing device 102. The metric may be compared to a threshold amount by the first mobile computing device 102. The threshold may be a predetermined amount of a metric. The threshold may be defined by a user. The threshold may be based on historical performance under various metric conditions. The threshold may be a predetermined metric amount that once exceeded may be associated with a degraded data connection that provides data flow and/or connection speeds below a targeted amount. Exceeding a threshold may include exceeding the metric amount negatively or positively. For example, a metric may exceed a threshold positively where the metric is greater than the threshold. In another example, a metric may exceed the threshold negatively where the metric is less than the threshold. In some examples, the metric of the data connection may be determined to have exceeded the threshold when the data connection of the first mobile computing device 102 is lost. That is, the metric of the data connection may be determined to have exceeded the threshold when the first mobile computing device 102 is no longer connected to the access point 106 and/or to the Internet through the access point 106.

The memory resource of the first mobile computing device 102 may include instructions executable to send an instruction from the first mobile computing device 102 to a second mobile computing device 104. The instruction may be sent responsive to the determination that the metric of the data connection of the first mobile computing device 102 through the access point 106 has exceeded the threshold. The instructions may include an instruction to the second mobile computing device 104 to initiate an operation mode. The operation mode may be an operation mode that the second mobile computing device 104 does not have activated and/or is not engaged in at the time of the determination that the threshold has been exceeded and/or at the time of the instruction. For example, the second mobile computing device 104 may be operating in a cellular telephone only mode when it receives an instruction from the first mobile computing device 102 that it should initiate operation as a mobile hotspot.

Instructing the second mobile computing device 104 to initiate operation as a mobile hotspot may include configuring settings of the second computing device 104. For example, the first mobile computing device 102 may include toggling on a hotspot setting on the second mobile computing device 104. The first mobile computing device 102 may activate the Wi-Fi functionality and/or chipset for the second mobile computing device 104. The first mobile computing device 102 may activate the ability of the second mobile computing device 104 to detect and join a Wi-Fi network. The first mobile computing device 102 may activate the ability of the second mobile computing device 104 to serve as a wireless access point. The first mobile computing device 102 may activate the ability of the second mobile computing device 104 to allow a Wi-Fi compliant device to establish a Wi-Fi connection with the second mobile computing device 104 and to thereby utilize a data connection of the second mobile computing device 104 across the Wi-Fi connection. The first mobile computing device 102 may activate a Bluetooth functionality and/or chipset for the second mobile computing device 104. The first mobile computing device 102 may activate the ability of the second mobile computing device 104 to allow a Bluetooth compliant device to establish a Bluetooth connection with the second mobile computing device 104 and to thereby utilize a data connection of the second mobile computing device 104 across the Bluetooth connection.

The first mobile computing device 102 may be associated with the second mobile computing device 104. For example, the first mobile computing device 102 may be associated with the second mobile computing device 104 prior to determining when a metric of the data connection of the first mobile computing device 102 through an access point 106 has exceeded a threshold and/or prior to instructing, responsive to the determination, a second mobile computing device 104 to initiate an operation as a mobile hotspot. For example, the second mobile computing device 104 may utilize a security protocol including authentication of the first mobile computing device 102 prior to establishing a connection between the two. The authentication may be password-based, pin-based, token-based, proximity-based, profile-based, key-based, etc. In some examples, the association may be established by pairing the first mobile computing device 102 with the second mobile computing device 104. During pairing, the two devices may establish a relationship by creating a shared secret or link key. If both devices share the same link key, they may be said to be paired or bonded. Going forward, a device that wants to communicate only with a bonded device may cryptographically authenticate the identity of the other device and ensure that the other device is a same device that it previously paired with. The communications between the paired devices may be encrypted.

Once the authentication of the first mobile computing device 102 has been established with the second mobile computing device 104 the association, including the ability to connect, may be established between the two. The association may provide a permission to the first computing device 102 to send instructions regarding operation of the second mobile computing device 104 to the second mobile computing device 104.

The memory resource of the first mobile computing device 102 may include instructions executable to switch from the data connection provided through the access point 106 to a data connection provided through the mobile hotspot of the second mobile computing device. The switch may include a switch from utilizing a broadband data network wired to the access point 106 to a cellular data network wirelessly connected to the second mobile computing device 104. That is, the switch may include switching from using the access point 106 to route data from and to the first mobile computing device 102 across a broadband data network to using the second mobile computing device 104 as a router to route data from and to the first mobile computing device 102 across a cellular data network.

The switch may be initiated based on a determination that a metric of a data connection provided through the second mobile computing device 104 surpasses a metric of a data connection provided through the access point 106. As such, a metric of a data connection provided through the second mobile computing device 104 may be monitored and/or compared to a metric of the data connection provided through the access point 106. A metric of a data connection provided through the second mobile computing device 104 may be deemed to have surpassed a metric of a data connection provided through the access point 106 when the metric of the data connection provided through the second mobile computing device 104 exceeds the metric of a data connection provided through the access point 106. Specifically, surpassing may include exceeding the metric such that the metric of the data connection provided through the second mobile computing device 104 represents an indication of a more stable or faster data network connection than the metric of the data connection provided through the access point 106.

The switch may be initiated based on a determination that the second mobile computing device 104 is within a certain physical proximity to the first mobile computing device 102. As such, the first mobile computing device 102 may periodically monitor the proximity of the second mobile computing device 104. For example, the first mobile computing device 102 may ping the location of the second mobile computing device 104. The first mobile computing device 102 may limit the option of switching from the data connection provided through the access point 106 to a data connection provided through the mobile hotspot of the second mobile computing device 104 to instances where the second mobile computing device 104 is detected within the certain physical proximity of the first mobile computing device 102.

Switching from the data connection provided through the access point 106 to a data connection provided through the mobile hotspot of the second mobile computing device 104 may include disconnecting from a data connection provided through the access point 106 and connecting to a data connection provided through the mobile hotspot of the second mobile computing device 104. In some examples, the first mobile computing device 102 may continue to maintain a connection to the access point 106 in order to monitor data connection conditions across the data connection provided through the access point 106, while utilizing the data connection provided through mobile hotspot of the second mobile computing device 104 as the primary means for data communication from and to the first mobile computing device 102. For example, the first mobile computing device 102 may monitor a metric of the data connection provided through the access point 106 while utilizing the data connection provided through the mobile hotspot of the second mobile computing device 104 as the primary means for data communication from and to the first computing device 102.

The first mobile computing device 102 may monitor a metric of the data connection provided through the hotspot of the second mobile computing device 104 while utilizing the data connection provided through the hotspot of the second mobile computing device 104. The first mobile computing device may compare the metric of the data connection provided through the hotspot of the second mobile computing device 104 with the metric of the data connection provided through the access point 106. When the metric of the data connection provided through the hotspot of the second mobile computing device 104 is surpassed by the metric of the data connection provided through the access point 106 the first mobile computing device 102 may disconnect from the second mobile computing device 104, instruct the second mobile computing device 104 to cease operation as a mobile hotspot and/or deactivate its mobile hotspot functionality, and switch back to the data connection provided through the access point 106.

The memory resource of the first mobile computing device 102 may include instructions executable to search for another data connection source subsequent to switching from the data connection provided through the access point 106 to a data connection provided through the mobile hotspot of the second mobile computing device 104. Searching for another data connection may include scanning for available connections within a certain physical proximity to the first computing device 102 while utilizing the data connection provided through the mobile hotspot of the second mobile computing device 104 for data communication. In some examples, the first mobile computing device 102 may restrict the type of data connection sources that it searched for. Specifically, the first mobile computing device 102 may search for another data connection source that is a dedicated wireless access point as opposed to a computing device with another function such as a cellular telephone. The first mobile computing device 102 may search for another data connection source such as a dedicated wireless access point that is utilizing a data connection with an Internet Service Provider (ISP) established across a broadband data connection network and/or utilizing a data connection across a conventional telephone line of the public switched telephone network (PSTN). The first mobile computing device 102 may exclude another data connection source that utilizes a cellular data network from the search results.

Once the first mobile computing device 102 has identified another data connection source, the first mobile computing device 102 may determine whether to switch to the another data connection source. The determination may be based on the identification of the another data connection source. The determination may be based on determining a metric of the data connection provided by the another data connection source and/or a comparison of that metric to a metric of the data connection provided through the mobile hotspot of the second mobile computing device 104. Responsive to identifying another data connection source and/or determining whether to switch to the another data connection source in the manner described above, the first mobile computing device 102 may disconnect from the second mobile computing device 104 and switch to the data connection provided through the another data connection source. Additionally, the first mobile computing device 102 may, responsive to identifying another data connection source and/or determining whether to switch to the another data connection source in the manner described above, instruct the second mobile computing device 104 to cease operation as a mobile hotspot and/or deactivate its mobile hotspot functionality.

As such, the first mobile computing device 102 may persistently maintain a data connection with a relatively more stable and/or relatively faster data connection than other available connections. Additionally, the first mobile computing device 102 may conserve the battery life of the second mobile computing device 104. Since operating as a mobile hotspot may increase battery life consumption, curtailing operation as a mobile hotspot during periods where the first mobile computing device 102 has another connection source option that has a data connection metric that surpass a data connection metric associated with the mobile hotspot may extend battery life of the second mobile computing device 104.

Figure 2:
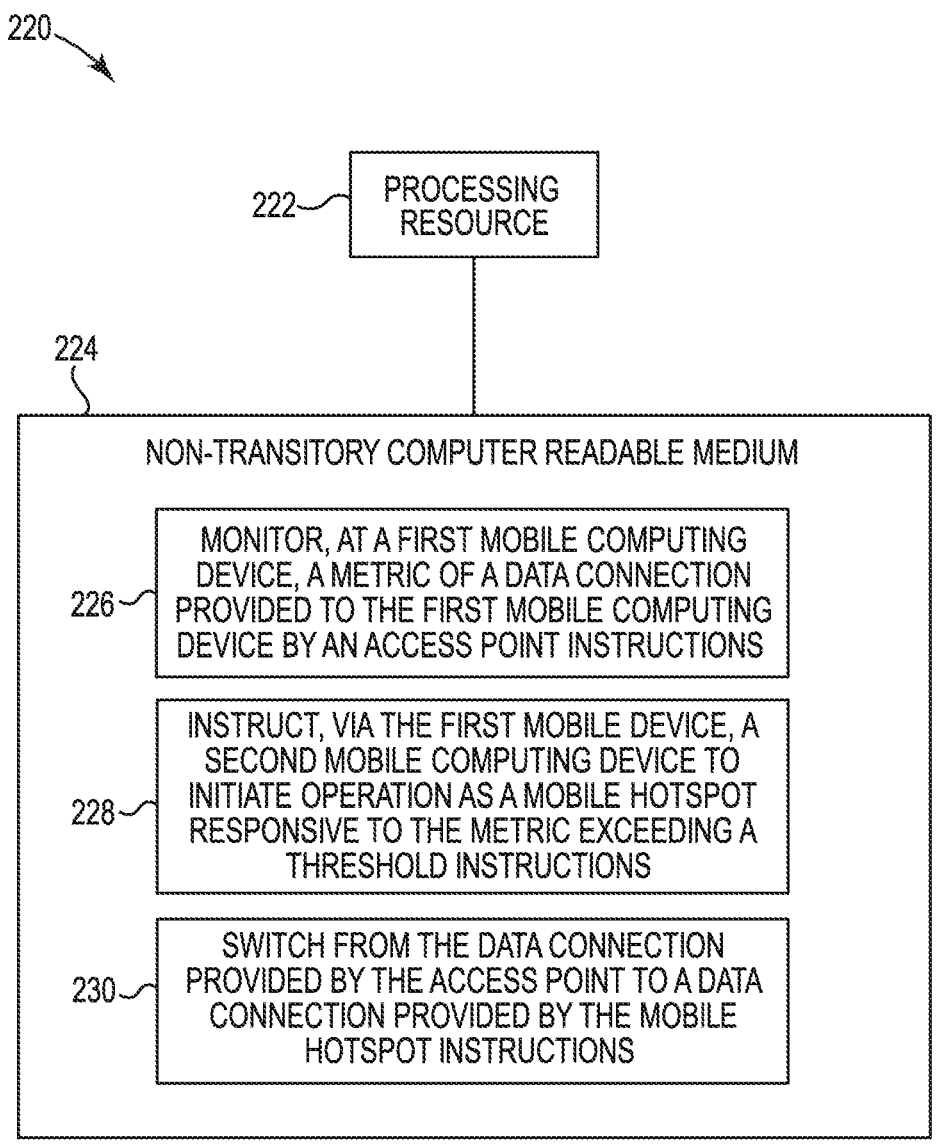
FIG. 2 illustrates a diagram of an example of a processing resource and a non-transitory computer readable medium to perform data connection switching consistent with the disclosure.

FIG. 2 illustrates a diagram 220 of an example of a processing resource 222 and a non-transitory computer readable medium 224 to perform data connection switching consistent with the disclosure. A memory resource, such as the non-transitory computer readable medium 224, may be used to store instructions (e.g., 224, 228, 230) executed by the processing resource 222 to perform the operations as described herein. A processing resource 222 may execute the instructions stored on the non-transitory computer readable medium 224. The non-transitory computer readable medium 224 may be any type of volatile or non-volatile memory or storage, such as random access memory (RAM), flash memory, read-only memory (ROM), storage volumes, a hard disk, or a combination thereof.

The example medium 224 may store instructions 226 executable by the processing resource 222 to monitor, at a first mobile computing device, a metric of a data connection provided to the first mobile computing device. The data connection may be a data connection provided to the first mobile computing device by an access point. The access point may be a wireless access point. The access point may be a Wi-Fi wireless access point. The access point may be connected to a home area network, business, campus area network, business network, etc. that includes a wired connection to an ISP.

Monitoring the metric of the data connection provided by the first mobile computing device may include monitoring a QoS metric associated with an Internet connection. That is, as an alternatively to or in addition to monitoring the strength of the connection between the first mobile computing device and the access point, the first mobile computing device may monitor the strength of the internet connection provided to the first mobile computing device via the access point. Since factors outside of the access point and even factors outside of a local network that the access point is connected to may influence the strength and/or performance of an internet connection, monitoring a metric of the internet connection may be performed instead of simply analyzing the strength and/or performance of the connection between the first mobile computing device and the access point.

The example medium 224 may store instructions 228 executable by the processing resource 222 to generate and/or send an instruction from the first mobile computing device to the second mobile computing device responsive to an amount of the monitored metric exceeding a threshold amount. The instruction may be transmitted via a pre-existing link such as a Bluetooth link between the first mobile computing device and the second mobile computing device.

The monitored metric may be compared to a threshold amount to determine whether it has exceeded the threshold. The threshold may include a metric-specific amount associated that, once exceeded, is associated with a network performance below a threshold speed, strength, and/or error rate. The monitored metric may exceed the threshold by dropping below the amount or rising about the amount. In some examples, the first mobile computing device may monitor a metric of a data connection of the second mobile computing device. The metric of the data connection of the second mobile computing device may represent a de facto metric of the data connection that may be provided by the operation of the second mobile computing device as a mobile hotspot. The data connection of the second mobile computing device may be monitored before, during, and/or after the period of time that a first mobile computing device is utilizing the data connection provided by the mobile hotspot as the primary means of data communication with, for example, an ISP. As such, some examples the threshold may be defined as an amount of and/or within a range of the metric of the data connection of the second mobile computing device and/or provided by the operation of the second mobile computing device as a mobile hotspot.

The instruction to the second mobile computing device may instruct the second mobile computing device to initiate operation as a mobile hotspot. Initiating operation as a mobile hotspot may include activating a mobile hotspot function of the second mobile computing device. Activating a mobile hotspot function may include initiating broadcasting a data connection from the second mobile computing device that may be connected to by a Wi-Fi compliant first mobile computing device. As such, activating the mobile hotspot function may include activating a mobile hotspot chipset that facilitates connection and communication between the first mobile computing device and the second mobile computing device. The mobile hotspot chipset may include a Wi-Fi chipset. The mobile hotspot chipset may be deactivated or in a reduced power consumption mode at the time the instruction is received.

The instruction to the second mobile computing device may instruct the second mobile computing device to begin providing a data connection to connected devices utilizing its connection to a cellular data network. Providing the cellular data connection of the second mobile computing device to connected devices via the mobile hotspot may include allowing the connected devices to begin to consume data from a cellular data plan associated with the second mobile computing device, in some examples, the operation of the second mobile computing device as a mobile hotspot may include allowing the connected devices to begin to consume data from a hotspot-specific data plan that charges a user a different rate or fee for data consumed across the cellular data network responsive to initiating operation as a mobile hotspot.

The example medium 224 may store instructions 230 executable by the processing resource 222 to switch from the data connection provided by the access point to a data connection provided by the mobile hotspot. As described above, the first mobile computing device may monitor a metric of the data connection provided by the mobile hotspot. In such examples, the switch from the data connection provided via the access point to the data connection provided by the mobile hotspot may be executed responsive to a comparison, at the first mobile computing device, of the metric of the data connection provided by the mobile hotspot and the metric of the data connection provided by the access point. That is, when a metric of a data connection provided by the mobile hotspot surpasses a corresponding metric of the data connection provided by the access point, then the first mobile computing device execute the switch from the data connection provided via the access point to the data connection provided by the mobile hotspot. As described above, a metric of a data connection provided by the mobile hotspot may surpass a corresponding metric of the data connection provided by the access point when the metric of the data connection provided by the mobile hotspot is indicated of a relatively faster, relatively stronger, relatively more regular, and relatively less-error prone data connection than that provided by the access point.

The first mobile computing device may continue to monitor both the metric of the data connection provided via the access point and the metric of the data connection provided by the mobile hotspot. The first mobile computing device may disconnect from the data connection provided by the mobile hotspot and reestablish the data connection provided by the access point responsive to a comparison, at the first mobile computing device, of the metric of the data connection provided by the mobile hotspot and the metric of the data connection provided by the access point. Disconnecting from the data connection provided by the mobile hotspot may include instructing the second mobile computing device to discontinue operation as a mobile hotspot and disabling a mobile hotspot chipset operating in the second mobile computing device.

Figure 3:
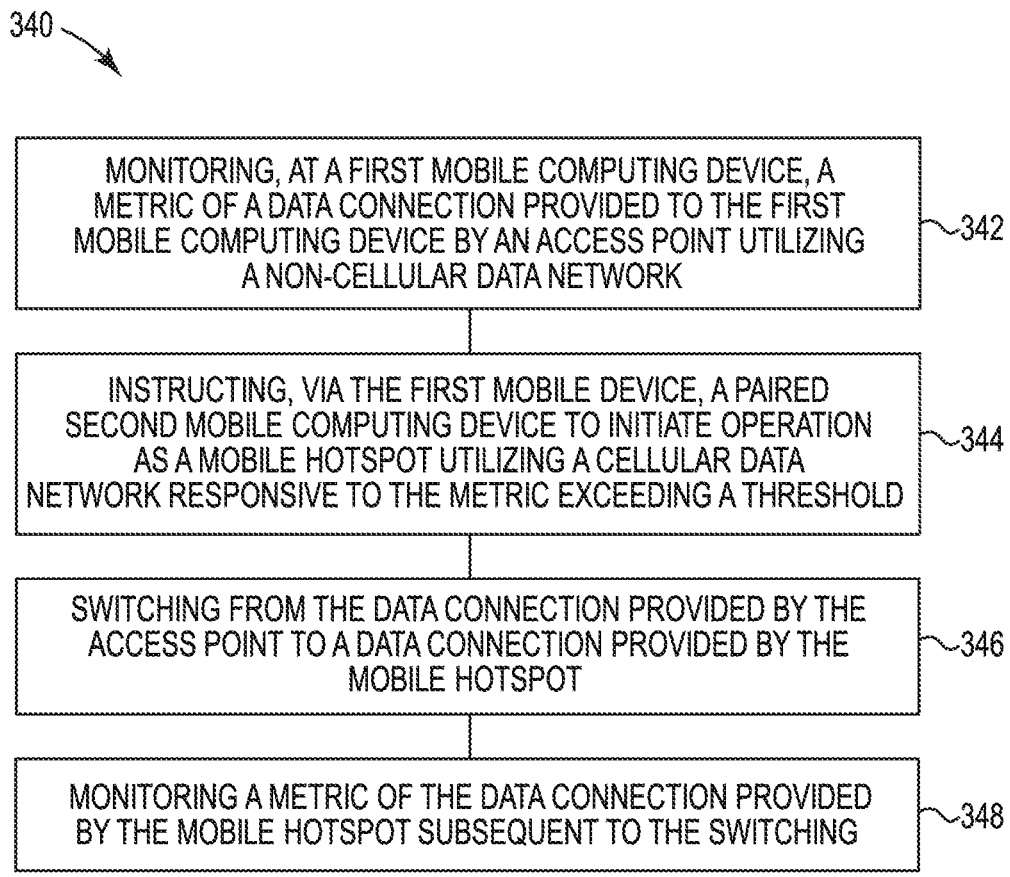
FIG. 3 illustrates a flow diagram of an example of a method to perform data connection switching consistent with the disclosure.

FIG. 3 illustrates a flow diagram of an example of a method 340 to perform data connection switching consistent with the disclosure. At 342, the method 340 may include monitoring, at a first mobile computing device, a metric of a data connection. The data connection may be a data connection provided to the first mobile computing device by an access point. The access point may provide the data connection by utilizing a non-cellular data network. A non-cellular data network may include a network that does not utilize a cellular telecommunications network to communicate data.

A non-cellular data network may include a data network that is not a network with a geographic cell architecture with each geographic cell served data by at least one fixed location transceiver such as a cell site or base station. A non-cellular network may include a data connection with an Internet Service Provider (ISP) established across a broadband data connection network and/or utilizing a data connection across a conventional telephone line of the public switched telephone network (PSTN). The access point may be physically wired to such a data network and/or wirelessly connected to an area network with network hardware physically wired to such a data network.

Monitoring a metric of a data connection provided to the first mobile computing device may include monitoring a QoS metric. For example, monitoring the metric of the data connection may include monitoring a quantitative measure of an error rate, a bit rate, a throughput, a transmission delay, amount of dropped packets, latency, an availability, a jitter, out-of-order delivery, etc. of data transmitted from or to the first mobile computing device across the data connection provided by the access point.

At 344, the method 340 may include instructing, via the first mobile device, a paired second mobile computing device. A paired second mobile computing device may include a second mobile computing device with an established relationship with the first mobile computing device. The established relationship may include a shared secret or link key between the first and second mobile computing devices. If both devices share the same link key, they may be said to be paired or bonded. Once paired, the first and second mobile computing devices may cryptographically authenticate the identity of the other device and ensure that the other device is a same device that it previously paired with before initiating further data transfer. The data transfer between the paired devices may be encrypted.

The instructions from the first mobile computing device to the second mobile computing device may include instructions for the second mobile computing device to initiate operation as a mobile hotspot utilizing its associated cellular data network. The instructions may be transmitted responsive to a determination that the metric of the data connection provided to the first mobile computing device by an access point has exceeded a threshold.

At 346, the method 340 may include switching from the data connection provided by the access point to a data connection provided by the mobile hotspot. Switching data connections may include disconnecting from the access point and/or connecting to the mobile hotspot. The user may not be prompted to authorize the switch each time it occurs. The user may not be prompted to input credentials to authorize the utilization of the data connection provided by the mobile hotspot. Instead, the previous bonding of the first and second mobile computing devices may provide an authentication to authorize the use by the first mobile computing device of the data connection provided by the mobile hotspot without additional user input.

At 348, the method 340 may include monitoring, at the first mobile computing device, a metric of the data connection provided by the mobile hotspot to the first mobile computing device. The metric may be monitored subsequent to the switching from the data connection provided by the access point to the data connection provided by the mobile hotspot.

Additionally, the first mobile computing device may monitor the consumption of a data plan associated with the second mobile computing device. As described above, the second mobile computing device may utilize a cellular data network connection. A cellular data network provided may provide subscribers with a data plan. In some examples the data plan may be unlimited. In some examples the data plan may be limited. In some examples the data plan may be subject to data throttling whereby data consumption past a certain limit results in a lower prioritization of and/or slower communication of data across the cellular data provider. In some examples, various fee structures may be associated with various tiers of data transmission (e.g., based on the amount of data transmitted, the type of data transmitted, the speed of data transmitted, the operation mode of the second mobile computing device when the data is transmitted, etc.). The second mobile computing device and/or the operation of the second mobile computing device as a mobile hotspot may be subject to limitations imposed by these data plans. Monitoring the consumption of a data plan may include monitoring an amount (e.g., in megabytes, gigabytes, terabytes, etc.) consumed relative to the various limitations imposed by the data plans.

The first mobile computing device may disconnect from a mobile hotspot, deactivate the operation of the second mobile device as a hotspot, and/or switch to a connection with an access point utilizing a non-cellular data network responsive to a determination that data consumption has reached a threshold associated with one of the above described limitations of a data plan. For example, the first mobile computing device may deactivate the operation of the paired second mobile computing device as a mobile hotspot responsive to a determination that a portion of a data limit of the paired second mobile computing device has been consumed. In some examples, the first mobile computing device may reestablish, responsive to a determination that a portion of a data limit of the paired second mobile computing device has been consumed, the data connection provided by the access point despite the metric of the data connection provided by the mobile hotspot surpassing the metric of the data connection provided by the access point. That is, despite a metric of the data connection provided by the mobile hotspot indicating that the data connection provided by the mobile hotspot would provide a relatively stronger, faster, more stable, and/or less error prone data connection than the access point, the first mobile computing device may switch to the data connection provided by the mobile hotspot.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 102 may refer to element "02" in FIG. 1. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. Further, as used herein, "a" and "a number of" an element and/or feature can refer to one or more of such elements and/or features.

What is claimed:

1. A first mobile computing device comprising:
   a memory resource comprising executable instructions to:
      determine, by the first mobile computing device, when a metric of a data connection of the first mobile computing device through an access point has exceeded a threshold;
      responsive to the determination, instruct, by the first mobile computing device, a second mobile computing device to initiate an operation as a mobile hotspot; and
      responsive to a comparison, at the first mobile computing device, of a metric of a data connection provided by the mobile hotspot to the metric of the data connection provided by the access point, switch from the data connection through the access point to a data connection through the mobile hotspot of the second mobile computing device.

2. The first mobile computing device of claim 1, wherein the metric of the data connection of the first mobile computing device is a quality of service metric associated with internet access.

3. The first mobile computing device of claim 1, wherein the metric of the data connection is determined to have exceeded the threshold when the data connection of the first mobile computing device is lost.

4. The mobile computing device of claim 1, wherein a data connection through the mobile hotspot utilizes a cellular data network.

5. The first mobile computing device of claim 1, wherein the first computing device is paired with the second computing device.

6. The first mobile computing device of claim 1, comprising executable instructions to search for another data connection source subsequent to the switch.

7. The first mobile computing device of claim 6, comprising instructions to instruct the second mobile computing device to discontinue the operation as the mobile hotspot responsive to identifying another data connection source.

8. A non-transitory computer-readable medium containing instructions executable by a processor to cause the processor to:
   monitor, at a first mobile computing device, a metric of a data connection provided to the first mobile computing device by an access point;
   instruct, via the first mobile computing device, a second mobile computing device to initiate operation as a mobile hotspot responsive to the metric exceeding a threshold; and
   responsive to a comparison, at the first mobile computing device, of a metric of a data connection provided by the mobile hotspot to the metric of the data connection provided by the access point, switch from the data connection provided by the access point to the data connection provided by the mobile hotspot.

9. The non-transitory computer-readable medium of claim 8, including instructions executable by the processor to monitor, at the first mobile computing device, the metric of the data connection provided by the mobile hotspot.

10. The non-transitory computer-readable medium of claim 9, including instructions executable by the processor to disconnect from the data connection provided by the mobile hotspot and reestablish the data connection provided by the access point responsive to a comparison, at the first mobile computing device, of the metric of the data connection provided by the mobile hotspot and the metric of the data connection provided by the access point.

11. A method comprising:
    monitoring, at a first mobile computing device, a metric of a data connection provided to the first mobile computing device by an access point utilizing a non-cellular data network;

instructing, via the first mobile computing device, a paired second mobile computing device to initiate operation as a mobile hotspot utilizing a cellular data network;

responsive to a comparison, at the first mobile computing device, of a metric of a data connection provided by the mobile hotspot to the metric of the data connection provided by the access point, switching from the data connection provided by the access point to the data connection provided by the mobile hotspot; and monitoring the metric of the data connection provided by the mobile hotspot subsequent to the switching.

12. The method of claim 11, comprising monitoring, via the first mobile computing device, consumption of a data plan associated with the second mobile computing device.

13. The method of claim 12, comprising deactivating, via the first mobile computing device, the operation of the paired second mobile device as a mobile hotspot responsive to a determination that a portion of a data limit of the paired second mobile computing device has been consumed.

14. The method of claim 12, comprising reestablishing, responsive to a determination that a portion of a data limit of the paired second mobile computing device has been consumed, the data connection provided by the access point despite the metric of the data connection provided by the mobile hotspot surpassing the metric of the data connection provided by the access point.

* * * * *